(12) United States Patent
Xu et al.

(10) Patent No.: US 9,264,561 B2
(45) Date of Patent: Feb. 16, 2016

(54) PRINTER WITH LINK MECHANISM

(75) Inventors: De-Ming Xu, Singapore (SG); Ke Gao, Shanghai (CN)

(73) Assignee: HEWLETT-PACKARD DEVELOPMENT COMPANY, L.P., Houston, TX (US)

(*) Notice: Subject to any disclaimer, the term of this patent is extended or adjusted under 35 U.S.C. 154(b) by 0 days.

(21) Appl. No.: 14/394,225

(22) PCT Filed: Apr. 27, 2012

(86) PCT No.: PCT/CN2012/074826
§ 371 (c)(1),
(2), (4) Date: Oct. 13, 2014

(87) PCT Pub. No.: WO2013/159338
PCT Pub. Date: Oct. 31, 2013

(65) Prior Publication Data
US 2015/0195419 A1    Jul. 9, 2015

(51) Int. Cl.
*H04N 1/00* (2006.01)
*G06K 15/16* (2006.01)
*G06K 15/00* (2006.01)

(52) U.S. Cl.
CPC ............ *H04N 1/00546* (2013.01); *G06K 15/16* (2013.01); *G06K 15/4025* (2013.01); *H04N 1/0057* (2013.01); *H04N 2201/0091* (2013.01); *H04N 2201/0094* (2013.01)

(58) Field of Classification Search
None
See application file for complete search history.

(56) References Cited

U.S. PATENT DOCUMENTS

| | | | |
|---|---|---|---|
| 5,559,609 A * | 9/1996 | Yamada | H04N 1/00543 358/400 |
| 5,896,206 A | 4/1999 | Kellogg | |
| 6,246,493 B1 * | 6/2001 | Uchiyama et al. | 358/498 |
| 6,384,940 B1 * | 5/2002 | Kawai et al. | 358/474 |
| 6,448,994 B1 | 9/2002 | Kim et al. | |
| 6,462,839 B1 | 10/2002 | Short | |
| 6,714,326 B1 * | 3/2004 | Yamada | 358/498 |
| 6,976,715 B2 * | 12/2005 | Lyon | E05C 19/16 292/251.5 |
| 7,386,252 B2 | 6/2008 | Portig et al. | |
| 7,447,466 B2 * | 11/2008 | Ikebata | G03G 21/1628 399/110 |
| 7,894,748 B2 * | 2/2011 | Su | H04N 1/00519 399/125 |
| 8,025,359 B2 | 9/2011 | Yano | |
| 8,120,821 B2 * | 2/2012 | Ishida et al. | 358/474 |
| 8,427,718 B2 * | 4/2013 | Omoya | 358/475 |
| 8,514,464 B2 * | 8/2013 | Takamura et al. | 358/474 |
| 8,730,542 B2 * | 5/2014 | Nakamura | 358/498 |

(Continued)

FOREIGN PATENT DOCUMENTS

| CN | 1580965 A | 2/2005 |
|---|---|---|
| CN | 101132466 A | 2/2008 |

(Continued)

*Primary Examiner* — Dung Tran
(74) *Attorney, Agent, or Firm* — Dhand Law PC

(57) ABSTRACT

The disclosure relates to a multi-functional printer. The multi-functional printer comprises an automatic document feeder member located in a scanner device and being movable between a unlifted position and a lifted-up position; a pen door located in a printer device and being movable between an open position and a closed position; and a link mechanism positioned between the automatic document feeder member and the pen door, such that when the automatic document feeder member is moved between the unlifted position and the lifted-up position, the pen door moves with the automatic document feeder member to open or close the pen door.

20 Claims, 5 Drawing Sheets

(56) References Cited

U.S. PATENT DOCUMENTS

2008/0008512 A1    1/2008   Hawryschuk et al.
2010/0158567 A1    6/2010   Jeon
2011/0149354 A1*   6/2011   Takamura et al. ............ 358/474

FOREIGN PATENT DOCUMENTS

| CN | 102035963 A | 4/2011 |
|---|---|---|
| JP | 2008-912 A | 1/2008 |

* cited by examiner

PRINTER WITH LINK MECHANISM

BACKGROUND

A wide variety of devices are available for producing hardcopy documents. Such devices include printers, copiers, and multi-functional printers (also referred to as combined printer/copiers) that are equipped with both a printer device for printing documents and a scanner device for receiving image information.

These multi-functional printers commonly include an automatic document feeder member located in the scanner device. A pen door (also referred to as printer cartridge door) is often provided in the printer device, so that users can replace printer cartridges or ink pens and clear paper jams.

DESCRIPTION OF DRAWINGS

Non-limiting example(s) will now be described with reference to the accompanying drawings, in which.

DESCRIPTION OF THE EMBODIMENTS

The following is a detailed description of the best presently known mode of carrying out the disclosures. This description is not to be taken in a limiting sense, but is made merely for the purpose of illustrating the general principles of the disclosures. Additionally, it is noted that although the disclosure utilizes a multi-functional printer as an example, the disclosure may also utilizes other types of printers.

Figure 1:
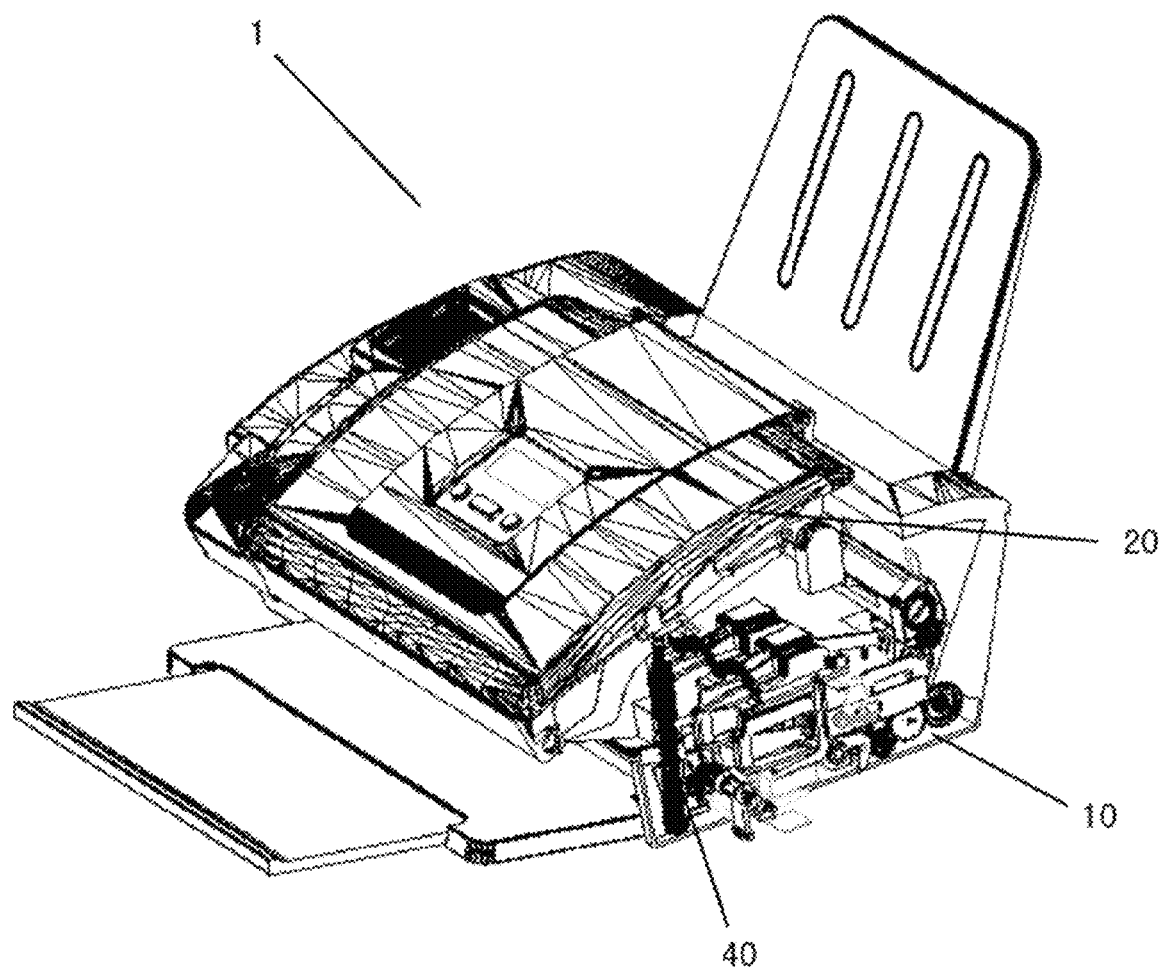
FIG. 1 is a perspective view of a multi-functional printer including a link mechanism according to an example of the present disclosure, wherein the pen door is at a closed position.

FIG. 1 is a perspective view of a multi-functional printer 1 including a link mechanism 40 according to an example of the present disclosure.

As shown in FIG. 1, the multi-functional printer 1 includes a printer device 10 and a scanner device 20. According to the illustrated example, the multi-functional printer 1 includes an Inkjet based printer device 10 that has a removable printer cartridge (not shown in FIG. 1). However, the multi-functional printer 1 may have laser based printer device, without departing the scope of the disclosure. According to the illustrated example, the multi-functional printer also includes an optical scanner device 20. However, the multi-functional printer 1 may have other types of scanner devices, without departing the scope of the disclosure.

As shown in FIG. 1, the printer device 10 includes a printer housing 11 having a pen door 12, which is movable between an open position and a closed position and provides access to the interior of the printer housing. Such access allows users to clear printer jams and, in those instances where the printer device 10 is an ink jet printer (such as in the illustrated embodiment), to remove and Install printer cartridges. The printer device 10 also includes an automatic sheet feeder (ASF) member (not shown in FIG. 1) for automatically feeding paper sheets, an input tray (not shown in FIG. 1) for storing paper or other image bearing substrates and an output tray (not shown in FIG. 1) for storing finished products.

The scanner device 20 includes a scanner housing (not shown in FIG. 1) with a glass scanning window (not shown in FIG. 1) on which an object may be placed for scanning. A scanner cover (not shown in FIG. 1) is pivotably connected to the scanner housing. The image scanning hardware and processing circuitry are located within housing. After a sheet or other image bearing substrate is placed on the glass, the image is irradiated by a light source. The reflected light sensed by an image sensor that moves past the glass window and the signals generated by the sensor are processed and digitized. Thereby, user can scan a document with the scanner device and then print the document with the printer device.

Some multi-functional printers commonly include an automatic document feeder (ADF) member located in the scanner device and being movable between a default position and a lifted-up position. As shown in FIG. 1, the automatic document feeder member 30 is mounted on a scanner device 20, and includes a document-feeding tray, a document-receiving tray, a feed-in roller, an exit roller, a document-conveying path, and other conventional components. The components of the automatic document feeder member 30 are well known for those skilled in the art, and are not shown in the figures for clarity.

With respect to the other internal components of the printer device 10 and scanner device 20, it is noted that detailed discussions of various internal operating components of the printer device 10 and scanner device 20 which are not pertinent to the present disclosure, such as the printerhead assembly, image processing system and so on, have been simplified or omitted for the sake of simplicity.

Due to industrial design and structure layout constrain, the pen door 12 is hidden under the automatic document feeder member 30. If a user wants to change the printer cartridges or clear paper jams, he/she has to lift up the automatic document feeder member 30 first, and then open the pen door 12, which needs two actions.

In order to help the user to open the pen door 12 more conveniently, a link mechanism 40 is provided. The link mechanism 40 is positioned between the automatic document feeder member 30 and the pen door 12, such that when the automatic document feeder member 30 is moved between the unlifted position and the lifted-up position, the pen door 12 moves with the automatic document feeder member 30 to open or close the pen door. Thus, the pen door 12 is opened automatically follow the lift-up action of the automatic document feeder member 30.

Figure 2:
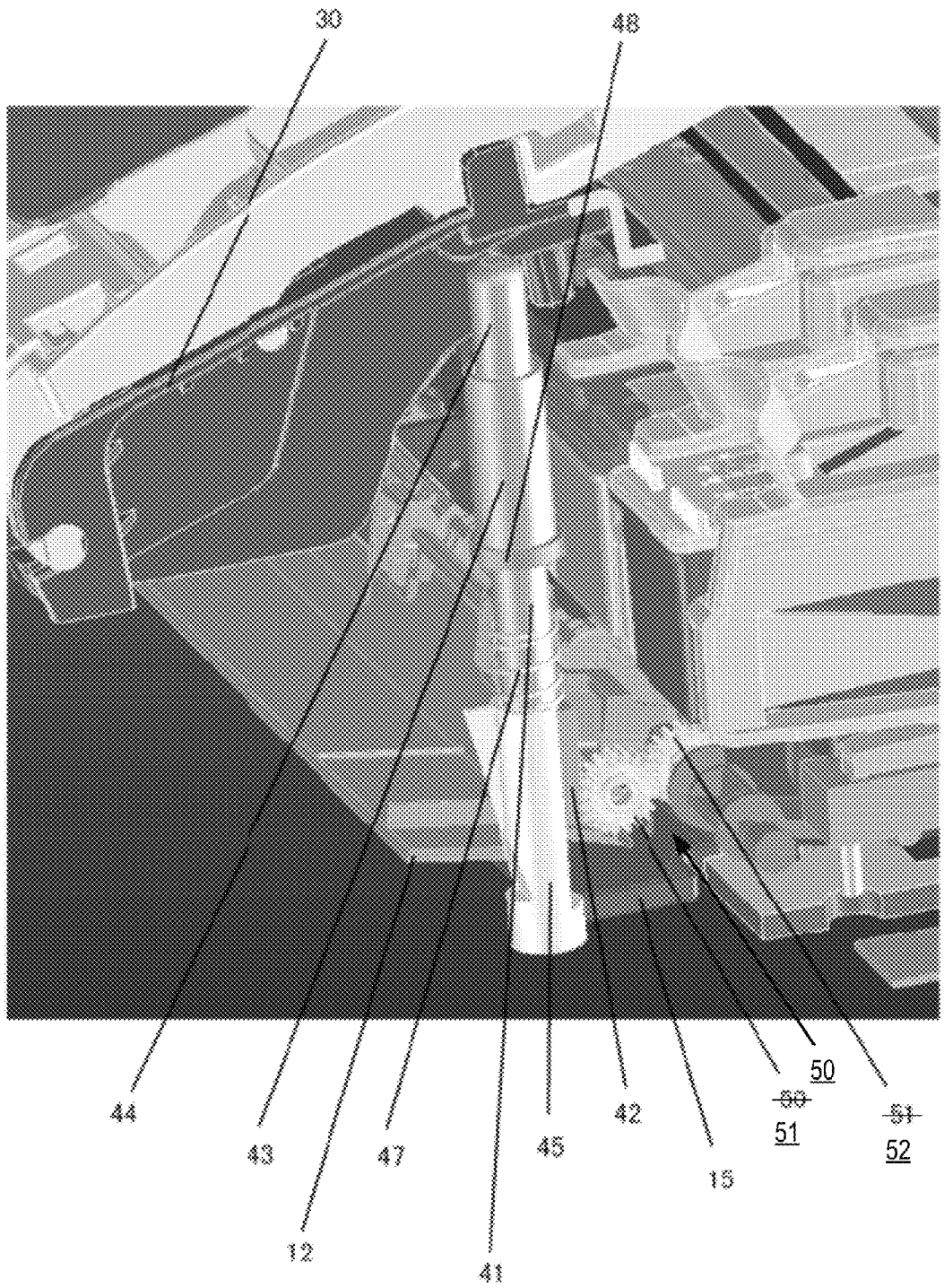
FIG. 2 is an enlarged perspective view of the link mechanism according to an example of the present disclosure, wherein the pen door is at the open position.
Figure 3:
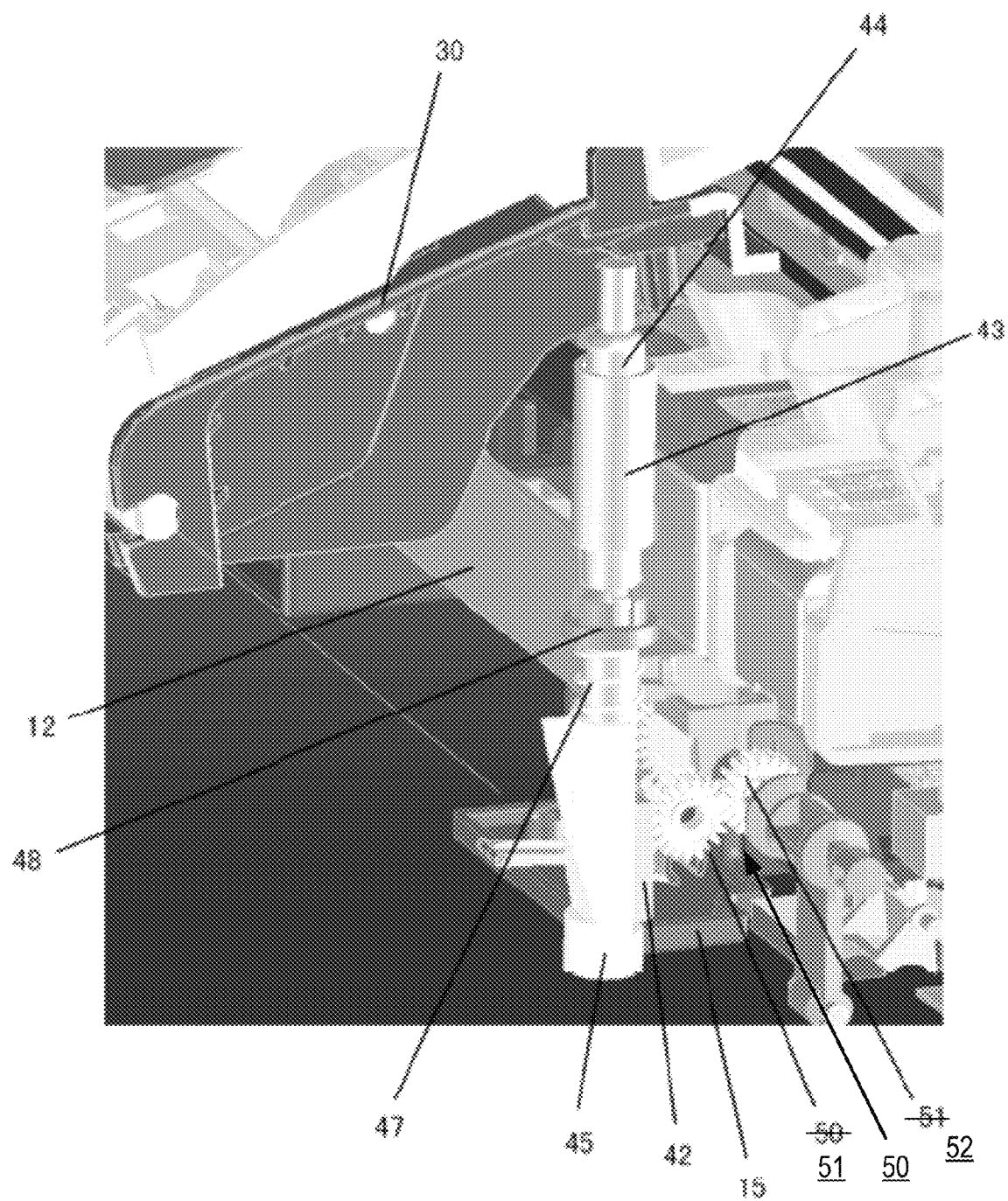
FIG. 3 is an enlarged perspective view of the link mechanism according to an example of the present disclosure, wherein the pen door is at the closed position.

FIG. 2 is an enlarged perspective view of the link mechanism 40 according to an example of the present disclosure, wherein the pen door 12 is at the open position. FIG. 3 is an enlarged perspective view of the link mechanism 40 according to an example of the present disclosure, wherein the pen door 12 is at the closed position.

As shown in FIGS. 2 and 3, the link mechanism 40 includes an actuator 41 positioned, under the automatic document feeder member 30 and a drive assembly 50 connected to the actuator 41 and the pen door 12.

In the example shown in FIGS. 2 and 3, the actuator 41 includes an upper guider 43, a lever 44 and a lower guider 45 fixed to a base 15 of the multi-functional printer 1. The lever 44 is positioned under the automatic document feeder member 30 at the upper end thereof and slidably housed in the lower guider 45 at the lower end thereof.

In the example shown in FIGS. 2 and 3, the lever 44 includes a rack portion 42 at the lower end thereof, and the drive assembly 50 includes a gear assembly. However, the link mechanism 40 may be other types of the link mechanism, such as multiple link-lever mechanism, without departing the scope of the disclosure.

In the example shown in FIGS. 2 and 3, the upper guider 43 and the lower guider 45 are sleeves. However, the upper guider 43 and the lower guider 45 may be other types of the guiders, such as a guide ring, without departing the scope of the disclosure.

Figure 4:
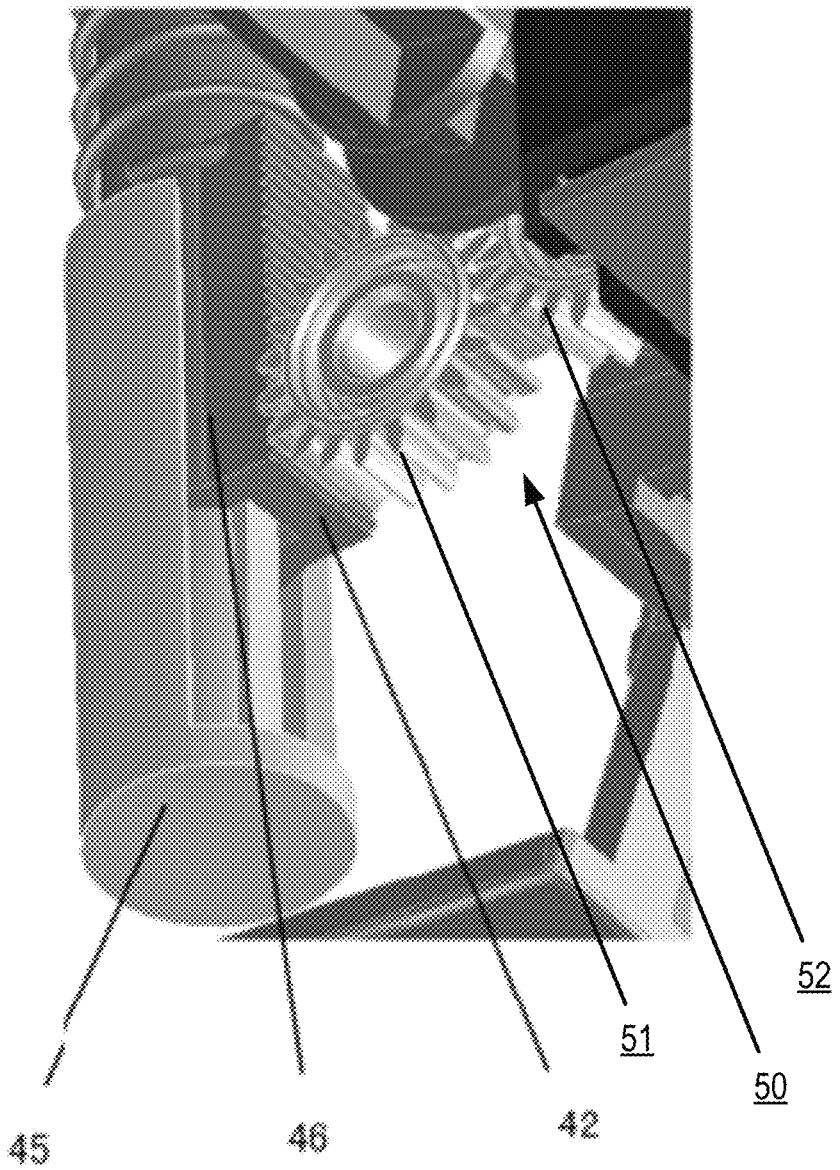
FIG. 4 is an enlarged view of an actuator lever and a gear assembly of the link mechanism, wherein the pen door is at closed position.

As shown in FIG. 4, the gear assembly includes an idler gear 51 meshed with the rack portion 42 and being used for changing the rotation direction and a driven gear 52 which is meshed with the idler gear 51 and transfers the force and motion between the actuator 41 and the pen door 12 to drive the pen door 12. The lower guider 45 has a opening 46 so that the rack portion 42 may protrude outwardly from the lever 44 to engage with the idler gear 51.

In the example shown in FIGS. 2 and 3, the link mechanism 40 further includes a return mechanism 47. In the example shown in FIG. 2, the return mechanism 47 is a spring, when the automatic document feeder member 30 is at its unfitted position, the spring is compressed by the body weight of the automatic document feeder member 30 to keep the pen door 3 at the closed position (as shown in FIG. 3) and to store energy; when the automatic document feeder member 30 is lifted tip, the spring provides force to open the pen door 12 (as shown in FIG. 2). However, the return mechanism 47 may be other types of the return mechanisms, such as a hydraulic cylinder, without departing the scope of the disclosure.

In the example shown in FIGS. 2 and 3, the actuator 41 further includes a stopper member 48 provided in a circumferential slot (not shown) of the actuator 41 for controlling the actuator travel distance. One end of the spring is fixed to the stopper member 48, and the other end of the spring is fixed to the lower guider 45.

FIG. 4 is an enlarged view of the actuator lever 44 and the gear assembly of the link mechanism 40, wherein the pen door 12 is at closed position. As shown in FIG. 4, the rack portion 42 at the lower end of the lever 44 is meshed with the idler gear 51. In the position of FIG. 4, the automatic document feeder member 30 is at its unlifted position (not lifted position).

When the automatic document feeder member 30 is at the unfitted position, the spring is compressed to store energy. When the automatic document feeder member 30 is lifted up from the unlifted position of FIG. 4, the spring activates the lever 44 with the stored energy, the lever 44 moves up, thus the idler gear 51 rotates clockwise, and the driven gear 52 rotates counterclockwise. Therefore, the pen door 12 is opened. Similarly, when the automatic document feeder member 30 is pressed down toward the unlifted position of FIG. 4, the lever 44 moves down under the weight of the automatic document feeder member 30 and the spring is again compressed to store energy, thus the idler gear 51 rotates counterclockwise, and the driven gear 52 rotates clockwise. Therefore, the pen door 12 is closed. The pen door 12 is locked or keeped at the closed position under the weight of the automatic document feeder member 30.

Figure 5:
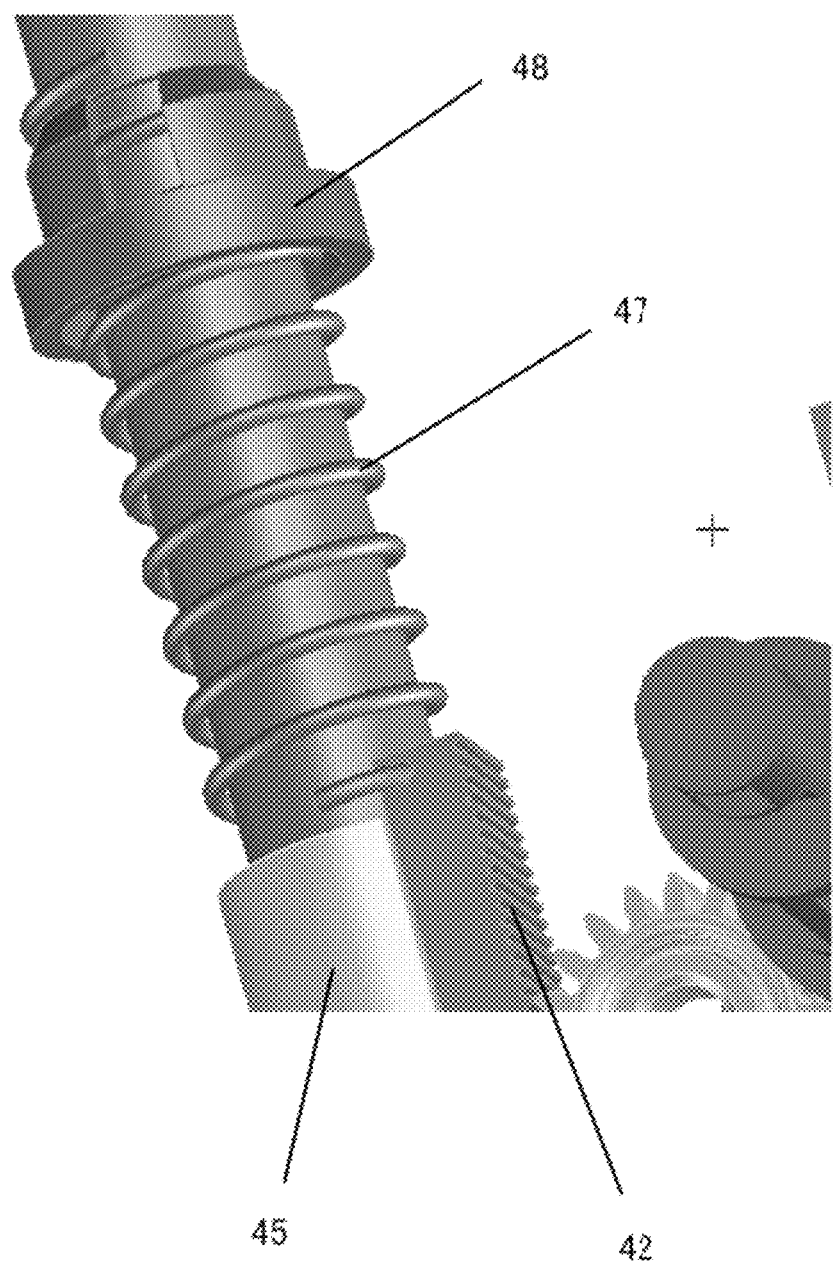
FIG. 5 is an enlarged perspective view of the return mechanism according to an example of the present disclosure.

FIG. 5 is an enlarged perspective view of the return mechanism 47 according to an example of the present disclosure. The spring is float fixed between the stopper member 48 and the lower guider 45.

The automatic document feeder member 30 may further include a lock mechanism (not shown) which holds the automatic document feeder member 30 at its lifted-up position when the automatic document feeder member 30 is lifted up.

The link mechanism 40 ensures the pen door 12 is closed and locked before the automatic document feeder member 30 is lifted up. The link mechanism 40 also protects the printhead and print mechanism from being subject to dust.

Having described a preferred embodiment of the multi-functional printer of the present disclosure, and in particular a link mechanism by which a pen door may be automatically open or close with the automatic document feeder member, it should be apparent to those skilled in the art that my disclosure may be modified in both arrangement and detail. Therefore, the protection afforded my disclosure should only be limited in accordance with the scope of the following claims.

Although specific embodiments have been illustrated and described herein, it will be appreciated by those of ordinary skill in the art that a variety of alternate and/or equivalent implementations may be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

The invention claimed is:

1. A device, comprising:
an automatic document feeder member being movable between a unlifted position and a lifted-up position;
a pen door being movable between an open position and a closed position; and
a link mechanism positioned between the automatic document feeder member and the pen door, such that when the automatic document feeder member is moved to the lifted-up position, the pen door moves with the automatic document feeder member to open the pen door by moving the pen door downward, and when the automatic document feeder member is moved to the unlifted position, the pen door moves with the automatic document feeder member to close the pen door by moving the pen door upward.

2. A multi-functional printer comprising:
an automatic document feeder member being movable between a unlifted position and a lifted-up position;
a pen door being movable between an open position and a closed position; and
a link mechanism positioned between the automatic document feeder member and the pen door, such that when the automatic document feeder member is moved between the unlifted position and the lifted-up position, the pen door moves with the automatic document feeder member to open or close the pen door, wherein the link mechanism includes:
an actuator positioned under the automatic document feeder member;
a return mechanism which is compressed to store energy when the automatic document feeder member is at the unlifted position and which activates the actuator with the stored energy when the automatic document feeder member is lifted from the unlifted position; and
a drive assembly connected to the actuator and the pen door.

3. The multi-functional printer of claim 2, wherein the actuator includes;
a lever;
an tipper guider for guiding the lever; and
a lower guider fixed to a base of the multi-functional printer, the lever positioned under the automatic document feeder member and slidably housed in the lower guider at the lower end thereof.

4. The multi-functional printer of claim 3, wherein the lever includes a rack portion at the lower end thereof, and the drive assembly includes a gear assembly.

5. The multi-functional printer of claim 4, wherein the gear assembly includes an idler gear meshed with the rack portion and a driven gear which is meshed with the idler gear and drives the pen door.

6. The multi-functional printer of claim 3, wherein the upper guider and the lower guider are sleeves.

7. The multi-functional printer of claim 2, wherein the return mechanism is a spring.

8. The multi-functional printer of claim 2, wherein the return mechanism is a hydraulic cylinder.

9. The multi-functional printer of claim 2, wherein the actuator further includes a stopper member.

10. The device of claim 1, wherein the automatic document feeder member further includes a lock mechanism which holds the automatic document feeder member at the lifted-up position.

11. The device of claim 1, wherein the link mechanism includes:
 an actuator positioned under the automatic document feeder member;
 a return mechanism which is compressed to store energy when the automatic document feeder member is at the unlifted position and which activates the actuator with the stored energy when the automatic document feeder member is lifted from the unlifted position; and
 a drive assembly connected to the actuator and the pen door.

12. The device of claim 11, wherein the actuator includes;
 a lever;
 an tipper guider for guiding the lever; and
 a lower guider fixed to a base of the multi-functional printer,
 the lever positioned under the automatic document feeder member and slidably housed in the lower guider at the lower end thereof.

13. The device of claim 12, wherein the lever includes a rack portion at the lower end thereof, and the drive assembly includes a gear assembly.

14. The device of claim 13, wherein the gear assembly includes an idler gear meshed with the rack portion and a driven gear which is meshed with the idler gear and drives the pen door.

15. The device of claim 12, wherein the upper guider and the lower guider are sleeves.

16. The device of claim 11, wherein the return mechanism is a spring.

17. The device of claim 11, wherein the return mechanism is a hydraulic cylinder.

18. The device of claim 11, wherein the actuator further includes a stopper member.

19. A printer, comprising:
 an automatic document feeder member movable between a unlifted position and a lifted-up position;
 a pen door movable between an open position and a closed position;
 a gear assembly comprising a driven gear, the driven gear coupled to the pen door; and
 a link mechanism positioned between the automatic document feeder member and the pen door, such that when the automatic document feeder member is moved to the lifted-up position, the pen door moves with the automatic document feeder member to open the pen door by rotating the driven gear counterclockwise, and when the automatic document feeder member is moved to the unlifted position, the pen door moves with the automatic document feeder member to close the pen door by rotating the driven gear clockwise.

20. The multi-functional printer of claim 19, wherein the gear assembly further comprises an idler gear meshed with the driven gear, the idler gear to move in conjunction with movement of the automatic document feeder member and rotate in an opposite direction of the driven gear.

* * * * *